United States Patent
Glasgow et al.

(10) Patent No.: US 10,540,986 B2
(45) Date of Patent: *Jan. 21, 2020

(54) PERSONALIZED, REAL-TIME AUDIO PROCESSING

(71) Applicant: eBay Inc., San Jose, CA (US)

(72) Inventors: Dane Glasgow, Los Altos, CA (US); David Ramadge, San Jose, CA (US); Matthew Bret MacLaurin, Santa Cruz, CA (US); Justin Van Winkle, Los Gatos, CA (US); Corinne Elizabeth Sherman, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,773

(22) Filed: May 17, 2019

(65) Prior Publication Data
US 2019/0272841 A1    Sep. 5, 2019

Related U.S. Application Data

(63) Continuation of application No. 15/906,836, filed on Feb. 27, 2018, now Pat. No. 10,304,476, which is a (Continued)

(51) Int. Cl.
*G10L 21/028* (2013.01)
*G02B 27/00* (2006.01)
(Continued)

(52) U.S. Cl.
CPC ........ *G10L 21/028* (2013.01); *G02B 27/0093* (2013.01); *G02B 27/022* (2013.01); (Continued)

(58) Field of Classification Search
CPC .... H04R 1/32; H04R 2201/40; H04R 25/407; G06F 3/013; G02B 27/017
(Continued)

(56) References Cited

U.S. PATENT DOCUMENTS

| 6,731,768 | B1 | 5/2004 | Delage |
| 7,460,150 | B1 * | 12/2008 | Coughlan ............. H04N 7/147 348/14.01 |

(Continued)

FOREIGN PATENT DOCUMENTS

JP    201412096 A    6/2014

OTHER PUBLICATIONS

Non-Final Office Action received for U.S. Appl. No. 15/013,537, dated Dec. 23, 2016, 17 pgs.
(Continued)

*Primary Examiner* — Mohammad K Islam
(74) *Attorney, Agent, or Firm* — Maschoff Brennan

(57) ABSTRACT

An apparatus and method for real-time audio processing employs a gaze detection sensor to detect a direction of a user's gaze and output a gaze signal corresponding to the detected direction of the user's gaze. A digital signal processing unit responds to a plurality of signals corresponding to a plurality of sounds received at the apparatus, and the determined direction of gaze to identify a signal of interest from the plurality of signals using the gaze signal. The signal of interest is processed for output to the user. In embodiments, a microphone array provides the plurality of signals. An imaging sensor may work with either the microphone array or the gaze detection sensor to identify the signal of interest.

20 Claims, 4 Drawing Sheets

Related U.S. Application Data continuation of application No. 15/013,537, filed on Feb. 2, 2016, now Pat. No. 9,905,244.

(51) Int. Cl.
| | | |
|---|---|---|
| *G06F 3/01* | (2006.01) | |
| *G06F 3/16* | (2006.01) | |
| *G06K 9/00* | (2006.01) | |
| *G02B 27/02* | (2006.01) | |
| *G10L 21/0364* | (2013.01) | |
| *H04R 29/00* | (2006.01) | |
| *H04R 1/40* | (2006.01) | |
| *H04R 3/00* | (2006.01) | |

(52) U.S. Cl.
CPC ............... *G06F 3/013* (2013.01); *G06F 3/16* (2013.01); *G06K 9/00604* (2013.01); *G10L 21/0364* (2013.01); *H04R 29/005* (2013.01); *H04R 1/406* (2013.01); *H04R 3/005* (2013.01); *H04R 2201/403* (2013.01)

(58) Field of Classification Search
USPC ................... 381/14.08, 313, 14.16; 348/169
See application file for complete search history.

(56) References Cited

U.S. PATENT DOCUMENTS

| | | | |
|---|---|---|---|
| 9,905,244 B2 | 2/2018 | Glasgow et al. | |
| 10,304,476 B2 | 5/2019 | Glasgow et al. | |
| 2003/0135116 A1* | 7/2003 | Ogasawara | A61B 8/00 600/437 |
| 2008/0297589 A1* | 12/2008 | Kurtz | H04N 7/147 348/14.16 |
| 2010/0074460 A1* | 3/2010 | Marzetta | G02C 11/06 381/313 |
| 2011/0013793 A1 | 1/2011 | Klemenz et al. | |
| 2011/0074911 A1* | 3/2011 | Khouri | H04N 7/147 348/14.08 |
| 2011/0279666 A1* | 11/2011 | Strombom | A61B 3/113 348/78 |
| 2012/0128186 A1* | 5/2012 | Endo | H04R 25/407 381/313 |
| 2012/0163606 A1* | 6/2012 | Eronen | H04S 7/302 381/22 |
| 2012/0163625 A1* | 6/2012 | Siotis | H04R 3/005 381/92 |
| 2012/0257036 A1* | 10/2012 | Stenberg | G03B 31/00 348/78 |
| 2012/0295708 A1* | 11/2012 | Hernandez-Abrego | G06F 3/167 463/36 |
| 2013/0120522 A1* | 5/2013 | Lian | H04N 7/15 348/14.08 |
| 2013/0259238 A1* | 10/2013 | Xiang | G06F 3/017 381/17 |
| 2013/0300648 A1* | 11/2013 | Kim | G06F 3/011 345/156 |
| 2013/0307771 A1* | 11/2013 | Parker | G06F 3/013 345/158 |
| 2013/0335507 A1* | 12/2013 | Aarrestad | H04N 7/15 348/14.08 |
| 2014/0006026 A1 | 1/2014 | Lamb et al. | |
| 2014/0010391 A1* | 1/2014 | Ek | G06F 3/011 381/310 |
| 2014/0184550 A1* | 7/2014 | Hennessey | G06F 3/013 345/173 |
| 2014/0211319 A1* | 7/2014 | Park | G02B 27/01 359/630 |
| 2014/0328505 A1* | 11/2014 | Heinemann | H04S 7/303 381/303 |
| 2015/0063603 A1* | 3/2015 | Henderek | G06F 3/013 381/122 |
| 2015/0138595 A1* | 5/2015 | Sugimoto | H04N 1/0044 358/1.15 |
| 2015/0210292 A1* | 7/2015 | George-Svahn | B60W 50/10 701/45 |
| 2015/0338914 A1* | 11/2015 | Andrysco | G06F 3/041 345/173 |
| 2015/0346845 A1* | 12/2015 | Di Censo | G06F 3/0346 707/766 |
| 2016/0080874 A1* | 3/2016 | Fullam | H04R 25/407 381/313 |
| 2016/0142830 A1* | 5/2016 | Hu | G02C 11/06 434/185 |
| 2016/0282937 A1* | 9/2016 | Thorn | G06T 17/00 |
| 2017/0111595 A1* | 4/2017 | Soni | H04L 65/4092 |
| 2018/0091923 A1* | 3/2018 | Satongar | H04R 5/033 |

OTHER PUBLICATIONS

Response to Non-Final Office Action filed Mar. 23, 2017, for U.S. Appl. No. 15/013,537, 8 pgs.
Final Office Action received for U.S. Appl. No. 15/013,537, dated May 26, 2017, 15 pgs.
Response to Final Office Action filed Jul. 31, 2017, for U.S. Appl. No. 15/013,537, 8 pgs.
Advisory Action received for U.S. Appl. No. 15/013,537, dated Aug. 9, 2017, 2 pgs.
Notice of Allowance received for U.S. Appl. No. 15/013,537, dated Oct. 13, 2017, 7 pgs.
Non-Final Office Action received for U.S. Appl. No. 15/906,836, dated Sep. 4, 2018, 21 pgs.
Response to Non-Final Office Action filed Dec. 4, 2018, for U.S. Appl. No. 15/906,836, 10 pgs.
Notice of Allowance received for U.S. Appl. No. 15/906,836 dated Jan. 17, 2019, 7 pgs.
International Search Report and Written Opinion received for PCT Application No. PCT/US2017/015463, dated Apr. 28, 2017, 9 pgs.
Notice of Allowance received for Korean Patent Application No. 10-2018-7022362, dated May 31, 2019, 3 pgs.
Extended European Search Report received for European Patent Application No. 17747963.1, dated Sep. 12, 2019, 7 pgs.

* cited by examiner

PERSONALIZED, REAL-TIME AUDIO PROCESSING

CROSS-REFERENCE TO RELATED APPLICATIONS

This application is a continuation of U.S. patent application Ser. No. 15/906,836, filed on Feb. 27, 2018; which is a continuation of U.S. patent application Ser. No. 15/013,537, filed on Feb. 2, 2016, now U.S. Pat. No. 9,905,244, issued on Feb. 27, 2018; the disclosures of which are incorporated herein by reference in their entireties.

TECHNICAL FIELD

This application relates generally to the field of audio processing and in particular, sound detection and enhancement.

BACKGROUND

There are many environments where the ability to hear and distinguish a certain noise or sounds from others in the environment is important. For example, in a crowded lecture theater, an audience member listening to a speaker/lecturer may encounter noise from a variety of sources. These could include noise sources inside the theater, such as air conditioning or other ventilation, cellphones of other audience members, people talking or shuffling papers during the speaker/lecturer's presentation, and the like. Noise also could come from outside the lecture theater (e.g. traffic, hallway voices, custodians operating cleaning equipment, and the like). In such environments, a listener's ability to discern or hear desired sounds from others can be diminished. In addition, as a speaker or listener moves about the lecture theater, the sound conditions may change. For example, if the listener is sitting too close to the speaker, or a set of audio speakers, the sound level may be too high. Alternatively, if the listener is too far away from the sound sources, the sound level may be too low. Other noisy environments, such as parties, busy public streets, and stadiums also present hearing challenges.

Noise cancellation systems process noise based on existing pre-determined criteria. For example, some systems, such as those utilizing automatic gain control, utilize a reference level and determine whether a noise signal is above that level. If the noise signal is not above the reference level, then it is considered unwanted noise and is removed. Such systems do not take into account factors which may, for example, make an otherwise low-level signal a desired signal.

BRIEF DESCRIPTION OF THE DRAWINGS

The present disclosure is illustrated by way of example, and not by way of limitation, in the figures of the accompanying drawings in which.

DETAILED DESCRIPTION

Figure 1:
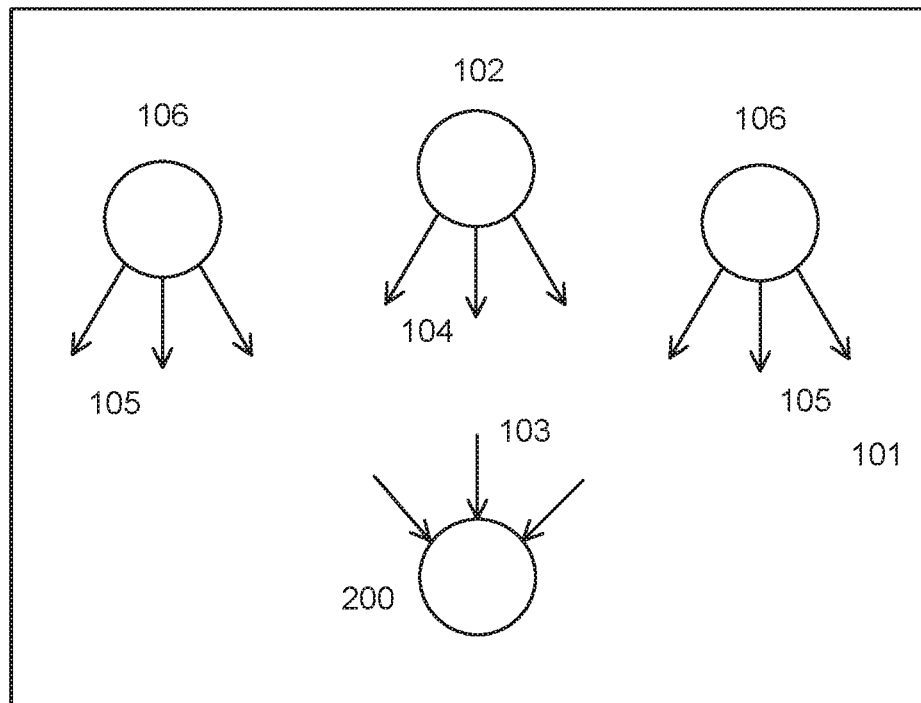
FIG. 1 is a diagram depicting an exemplary environment in which a real-time audio processing device may function.

Referring to FIG. 1, according to an embodiment, a real-time audio processing device 200 may be located in a lecture hall or theater 101, where a listener may wish to focus on sound coming from a speaker/lecturer or other sound source 102. The device 200 may be closer to the source 102 than to other sound/noise sources 106, may receive a plurality of sounds 103, some of which may be desired, and some of which may be noise. The plurality of sounds may include a desired sound 104, noise 105 from noise sources 106 within a certain vicinity 101 of the speaker, and/or any other type of noise.

Relative positioning and sound levels in other environments can represent similar issues to those encountered in a lecture hall or theater. Any kind of crowded room, as for example at a party or reception in which two people might wish to converse in a room full of other conversations and unrelated noise; a busy public street or crowded public transportation vehicle; or even an office with cubicles can present listening challenges. In any of the environments listed here, the actual sound source on which the listener wishes to focus may not be the loudest sound source in the vicinity.

Figure 2:
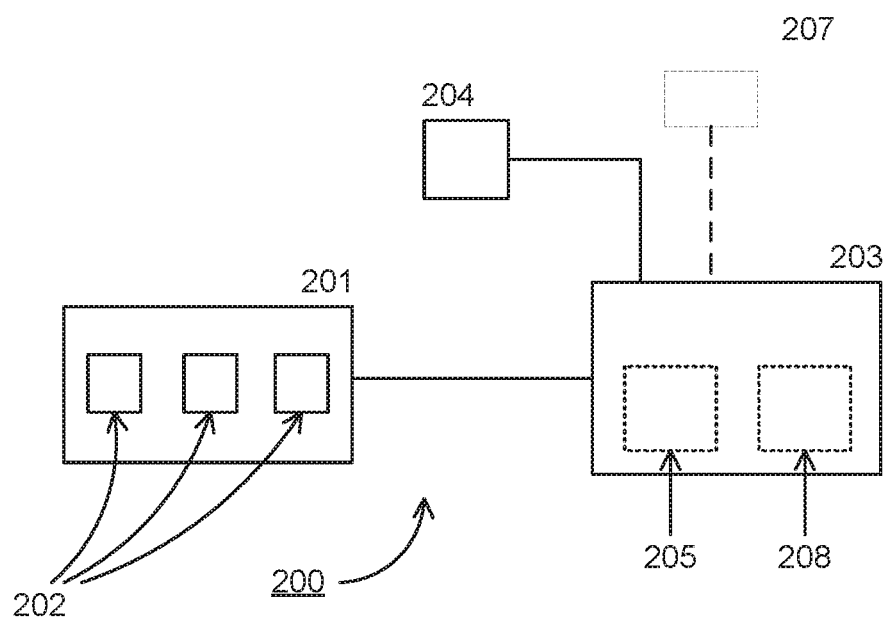
FIG. 2 is a diagram illustrating a real-time audio processing device according to embodiments.

Referring now to FIG. 2, the real-time audio processing device 200 may include a microphone array 201, having one or more microphones 202. In an embodiment, the microphone array 201 as well as the real-time audio processing device 200 may be integrated into a user's headphones. Microphone array 201 detects the plurality of sounds and converts the sounds into a plurality of signals. The position of each microphone 202 within the array 201, together with the magnitude of signals coming from each microphone, can provide information about directionality and sound level. Microphone array 201 then outputs the plurality of signals to a signal processing unit 203 of the real-time audio processing device 200.

In the following discussion, signal processing unit 203 will be referred to as a digital signal processing unit, or DSP unit. DSP chips are known to be designed, configured, and/or otherwise implemented in a way that makes sound processing efficient. However, the techniques and concepts described herein also may be implemented in a wide range of suitably programmed (micro)processors, (micro)controllers, or other computing or processing devices.

In an embodiment, DSP unit 203 may use information about which signal comes from which microphone 202 in array 201 to determine sound directionality and relative level. Using this information, together with the signals, the DSP unit 203 may determine a magnitude, frequency and direction of arrival component for each signal within the plurality of signals. DSP unit 203 may implement one or more direction finding algorithms to determine the direction of arrival component of each signal. Such algorithms may include, by way of non-limiting example, Time Difference of Arrival, Triangulation, and Particle Velocity Measurement. Other algorithms will be known to ordinarily skilled artisans. In an embodiment, DSP unit 203 also determines a level of persistence for each signal in the plurality of signals. In an embodiment, the DSP unit 203 may determine persistence in either a signal's amplitude, or frequency, or duration, or all three. In this manner, real-time audio processing device 200 may distinguish between transient, sudden, and/or random sounds, on the one hand, and, for example, speech (which tends to have a certain degree of persistence in terms of level and/or duration).

Referring again to FIG. 2, real-time audio processing device 200 may include a gaze detection sensor 204 to determine a direction of the user's gaze during operation of the real-time audio processing device. The gaze detection sensor 204 may be a gyroscope sensor, accelerometer or any sensor device capable of sensing rotational motion or changes in angular velocity. In this kind of implementation, based on a position of the sensor 204 relative to the user's line of sight, movement and/or position of a user's head may be a surrogate for the user's actual gaze.

In an embodiment, the gaze detection sensor 204 may use technology similar to that in Google Glass™, for example, to detect the actual position of the user's eyes. Technology starting to appear in helmets or goggles that pilots wear, enabling them to move their eyes to control aspects of aircraft operation instead of having to move their hands from the controls, also could be used. In another embodiment, the gaze detection sensor 204 may use the relative position of the microphones in the microphone array 201 as placed on the user's head or body, and movement of the array, to derive information about the direction of the user's gaze. However, this approach likely would be less reliable because the desired sound source on which the listener may be focusing may not be the loudest source.

In an embodiment, DSP unit 203 may use the user's gaze to determine which sound(s) to emphasize or de-emphasize. Where there are multiple sound sources, as for example when talking to someone at a loud party where music is playing or other conversations are going on nearby, it may be that the desired sound (e.g. the speaker with whom the user is conversing) may not be the loudest sound source where the listener is positioned. Therefore, it may be desirable to be able to emphasize sound coming from the direction of the speaker, and de-emphasize sound coming from other directions. Aspects of embodiments of this approach now will be discussed.

As the user's gaze (or head or body position) tracks the direction of the speaker, the gaze detection sensor 204 may generate a signal corresponding to the direction of the user's gaze. DSP unit 203 may confirm that the direction of the user's gaze corresponds to the direction of the speaker's location by comparing movement of the array 201 or gaze detection sensor 204 relative to sound coming from the direction of the speaker.

According to an embodiment, the DSP unit 203 may implement any of a number of algorithms, known to ordinarily skilled artisans, for detecting and differentiating unwanted noise to supplement the real-time audio processing device's sound processing capabilities. By way of example only, the real-time audio processing device 200 may utilize acoustical beam-forming techniques, either as a separate module or algorithm, or, as depicted in FIG. 2, as module 205 within DSP unit 203. Using acoustical beam-forming is another way to emphasize sound coming from one direction, while de-emphasizing sound coming from other directions.

In an embodiment, when DSP unit 203 has confirmed that the user's gaze is tracking the speaker or other desired sound source, DSP unit 203 may determine whether the user's gaze is continuing to track. For example, using an accelerometer or other motion sensor, DSP unit 203 may determine the change in head movement, and/or change in speed of head movement over the same or different given time interval(s). More than a certain (threshold) amount of movement may indicate a change in focus from the speaker to another source. More than a certain (threshold) amount of speed of movement may indicate a head jerk, and not a change in focus. Depending on desired effect, the DSP unit 203 may be instructed either to heed or to ignore gaze direction shifts that gaze detection sensor 204 registers. Thus, for example, if a user turns, quickly or slowly, to hear another speaker (e.g. someone sitting next to the user at a lecture), and the user's gaze remains in that other speaker's direction for long enough, the DSP unit 203 may determine that the user has changed his/her gaze, and can focus on the nearby speaker.

DSP unit 203 can compare the direction of the user's gaze with the direction of sound arrival as represented by respective signals within the plurality of received signals. DSP unit 203 also can compare the magnitude of each signal within the plurality of received signals with each other to a preset magnitude reference threshold. DSP unit 203 then can determine which signals from the plurality of received signals have a direction of arrival component that matches the direction of the user's gaze and which signals have a magnitude that meets or exceeds the preset magnitude threshold. Signals having a direction of arrival component that matches the direction of the user's gaze and a magnitude that meets or exceeds the magnitude threshold may be considered as representing the desired sound, while signals that do not have a matching direction of arrival component or that are not sufficiently persistent may be considered as representing unwanted noise. If no signals having a direction of arrival component that corresponds to the detected direction of the user's gaze, and a magnitude that meets or exceeds the magnitude consistency threshold are detected, then the real-time audio processing device will restart and attempt to ascertain the desired sound again. In such an embodiment, sound magnitude may be given more significance than in other embodiments, in which the user's gaze is given the most emphasis.

In an embodiment, DSP unit 203 may compare a persistence of each signal within the plurality of signals to a persistence threshold. Persistence may be a function of both amplitude (magnitude) and duration. Signals that do not meet the persistence threshold may be considered to be unwanted noise. The factors discussed above, including direction of arrival, magnitude, and persistence value are exemplary only, and should not be construed as limiting the number of factors the DSP unit 203 can take into account in determining the desired sound.

In an embodiment, DSP unit 203 may assign weights to the direction of arrival, magnitude and persistence factors. DSP unit 203 may then take the weighted sum of all factors for each signal within the plurality of signals and compare the sum to a weighted reference factor. If the weighted sum of all factors for any signal within the plurality of signals meets or exceeds the weighted reference factor, then DSP unit 203 may determine that signal to be the desired sound signal. Signals not having a weighted sum that meets or exceeds the respective weighted reference factor may be considered as unwanted noise.

After determining which signal among the plurality of received signals represents the desired sound, DSP unit 203 may remove (cancel) or deemphasize (diminish) any signals representing unwanted noise. By way of example only, DSP unit 203 may remove signals representing unwanted noise by capturing a frequency profile of the unwanted noise, inverting the frequency profile and offsetting it, which provides the opposite of the unwanted noise signal. The opposite noise signal is then output to effectively cancel the unwanted noise. In an embodiment, DSP unit 203 could provide additional amplification to the desired sound, and correspondingly less amplification to the unwanted noise, thus emphasizing the desired sound as compared to the unwanted noise.

In an embodiment, as depicted in FIG. 2, the real-time audio processing device may include an imaging sensor 207 to look for the face of a speaker. The gaze detection sensor 204 uses the direction of the user's gaze to determine whether the user is looking at a desired sound source which may not be the loudest of the sources, but still is desired. The imaging sensor 207 uses the direction of the speaker's gaze, and may work with microphones 202 in microphone array 201 to determine that a loudest, desired sound source is coming from a speaker to whom the user wishes to listen. Such an embodiment may be useful where a listener turns his/her head briefly, for example, to make notes of a lecturer's remarks. In an embodiment, imaging sensor 207 could work with gaze detection sensor 204 to confirm a sound source direction, as for example when the user and the speaker are looking at each other.

There may be times when it is desirable to override the gaze detection sensor 204. For example, in a noisy environment, such as a crowded lecture hall or a moving subway car, it may be useful to lock on to the speaker as the desired source of sound, even though there will be times when the user will want to look away. In a lecture hall, for example, as noted earlier, the listener may want to look at his/her notebook, computer, or tablet, or consult some textual source while the lecturer is speaking. In a moving subway car, for example, the user may want to look at a map posted in the car. Looking away in such circumstances may change the sound source. But if the user can override the gaze detection sensor, the sound source can remain as is. The override may be temporary (e.g. changing after a short period of time, such as 5-10 seconds), or it may be permanent until the user turns the override off. Such an override may be accomplished, for example, via an override switch 208 which, while shown within DSP unit 203, may be onboard microphone array 201, or associated with gaze detection sensor 204, for the user's convenience.

The imaging sensor 207 may be a video sensor or infrared sensor or any sensor device with similar functionality. In an embodiment, facial recognition technology, as used in digital cameras and other applications, may be used, to the extent that, for example, such technology facilitates viewing of a speaker's eyes. The imaging sensor 207 may output signals corresponding to received images to DSP unit 203. DSP unit 203 may monitor the received signals of the imaging sensor 207 and may utilize an algorithm, including facial recognition or thermal recognition or the like, to determine whether a signal or signals received from imaging sensor 207 correspond to an image of a person speaking in the user's direction. Upon detecting that a person is speaking in the direction of the user, DSP unit 203 may emphasize signals coming from that direction, and deemphasize or cancel signals coming from a different direction (e.g. more than a certain number of degrees from a determined virtual centerline running between the speaker and the listener). The real-time audio processing device then may further process the signals coming from the speaker's direction to be at an optimal level by modifying the volume and frequency parameters of the signals to appropriate volume and frequency parameters as discussed previously.

There may be situations, for example, in a noisy room, in which two people who want to converse are across the room from each other, with several conversations going on in the area between them. If the people catch each other's eye, then imaging sensor 207 and/or gaze detection 204 may lock DSP unit 203 in to the speech of the person across the room, emphasizing that sound to the exclusion of other sound, so that the two people can converse, even when they are not next to each other. In this scenario, one person may wish to catch the eye of the person across the room. To facilitate that being done, the person seeking the attention may ping the person across the room to alert him/her that attention and/or conversation is desired. The person across the room, upon receiving the ping, may find the person seeking the attention and engage in eye contact. In that event, the real-time audio processing device 200 may function as described above. If the person across the room wishes to ignore the request, s/he may do so, of course.

Pinging may be done in any number of ways, from a signal broadcast between devices 200 that each person is wearing/using, to sending a signal using an app on a smartphone or other handheld device, or the like.

In an embodiment, a user may wish to communicate to a number of people in a room, a hall, an auditorium, or the like that s/he wants to have a conversation about something. To achieve that communication, the user may be able to broadcast a signal, unique to the user or to the user's source of sound, to the people in the area. In an embodiment, other users' devices 200 may receive the signal, and can respond by locking into that signal and hence to the initiator's sound/voice. Also in an embodiment, users may be able to access a list of various potential immediately local speakers via a smartphone or tablet app, and may select one of those speakers. In that event, the app could communicate the information to its respective device 200 and thus lock into that signal.

According to an embodiment, imaging sensor 207 may function as gaze detection sensor 204. In another embodiment, particularly in a lecture hall or the like, imaging sensor 207 may supplement gaze detection sensor by assisting the DSP unit 203 to process signals from a speaker, even in a situation in which the user is not looking in the direction of the speaker. DSP unit may give gaze detection sensor 204 priority over imaging sensor 207. In this way, when a user is looking at a lecturer, for example, gaze detection sensor 204 can work primarily with DSP unit 203 to ensure that the lecturer's speech is processed appropriately. When the user's gaze points downward to take notes, for example, imaging sensor 207 may be given priority. Alternatively, it may be recognized that when a user is looking down to take notes, gaze detection sensor 204 will show that the user is not looking in a direction from which sound is coming. In that circumstance, DSP unit 203 may ignore output from gaze detection sensor 204. This would be one way of implementing the functionality discussed above.

According to an embodiment, DSP unit 203 may be connected to a music or video player. Upon determining that there is someone speaking in the direction of the user, DSP unit 203 may be configured to automatically pause playback from the music or video player. In this fashion, a user/listener may opt to listen to someone who is speaking to him/her without having to fumble for playback controls.

According to an embodiment, if the user/listener is looking at a speaker while using the music or video player, it may be possible to have the real-time audio processing device determine that the user/listener wants to hear the speaker rather than playback from the music or video player. The device could respond to an audio command, or could use the gaze detection sensor 204 in the DSP unit 203 to instruct the device to suspend or pause playback so that the user/listener can hear the speaker.

In an embodiment, it may be desirable to be able to identify a sound source without the user looking directly at it. For example, in a symphony orchestra, often there are a plurality of different string instruments (e.g. violins, violas, cellos, basses), and/or a plurality of woodwinds (e.g. oboes, bassoons), and/or a plurality of brass instruments (e.g. trumpet, trombone, saxophone, French horn, tuba), and/or a plurality of percussion instruments (e.g. triangle, bass drum, tympani, snare drum), and/or keyboard instruments (e.g. piano, organ, harpsichord, electronic keyboard, clavier). The listings within these categories is not intended to be extensive, but merely to give an idea of the range of different instruments. Marching bands may have similar ranges of instruments.

In one of the just-described scenarios, a listener may want to focus on the first violinist, or on the second viola (e.g. in the case of a friend or relative playing in the orchestra who is not the concertmaster or the first violinist, who would be more readily identifiable by gaze). Or, there may be a soloist who is none of these things. In such scenarios, each performer may have metadata associated with him/her, which then would be identifiable with the musical instrument the performer is playing. If the DSP unit has, for example, a table with that metadata in it—something that could be downloaded prior to the performance, either at the concert or beforehand via an app), then during the concert, the user could input instruction to focus on the instrument(s) associated with particular metadata for one or more instruments, so that the sound from those instrument(s) would be highlighted.

Figure 3:
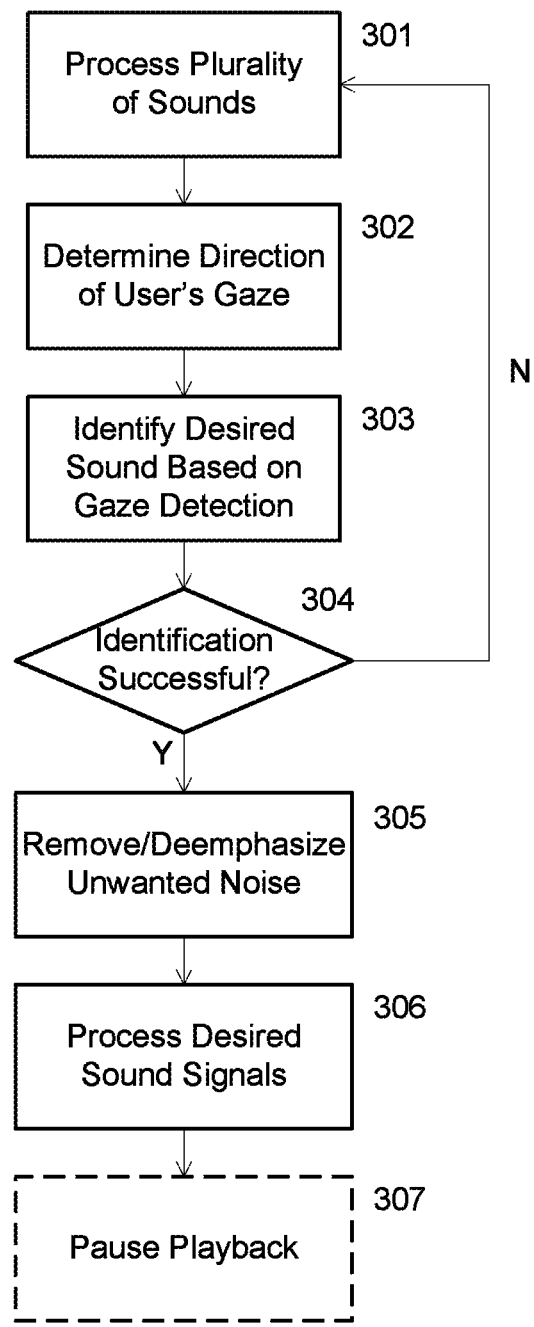
FIG. 3 is a flow chart illustrating an embodiment of a real-time audio processing method.

Referring now to FIG. 3, a method for real-time audio detection and processing begins at 301, when the real-time audio processing device receives a plurality of sounds and processes them into a plurality of signals. At 302, a direction of a user's gaze is determined. At 303, the DSP unit 203 uses the detected gaze to identify which signal(s) within the received plurality of signals correspond to desired sound and which signal(s) within the plurality of signals correspond to unwanted noise. The process may cycle through as shown at 304 in FIG. 3 until desired sound is identified successfully. At 305, the unwanted noise signals are removed or deemphasized using one or more of the algorithms discussed above. At 306, the desired sounds are processed to bring them into conformity with preset volume and frequency parameters. Finally, at 307, in an embodiment in which the user is wearing a audio playback device in which the real-time audio processing device is incorporated, playback may be paused to facilitate the user's hearing the speaker. Each of 301-307 may be implemented in accordance with any of the embodiments and techniques described above with respect to FIG. 2.

Figure 4:
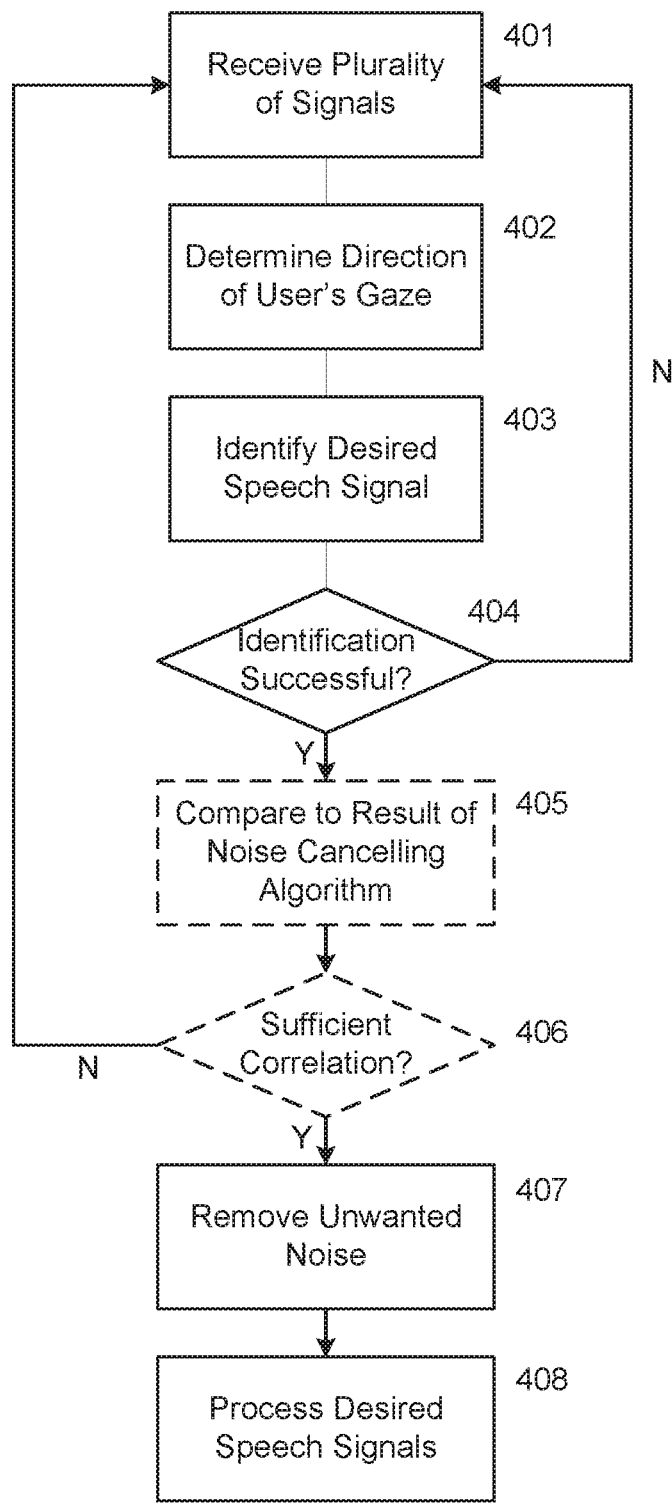
FIG. 4 is a flow chart illustrating an embodiment of a real-time audio processing method.

FIG. 4 represents a variant of the flow and accompanying description for FIG. 3, taking into account the use of imaging sensor 207 in conjunction with gaze detection sensor 204 according to an embodiment. At 401, the real-time audio processing device receives a plurality of sounds and processes them into a plurality of signals. At 402, a direction of a speaker's gaze is determined. At 403, the DSP unit 203 uses the detected speaker's gaze to identify which signal(s) within the received plurality of signals correspond to desired sound and which signal(s) within the plurality of signals correspond to unwanted noise. At 404, if there is not a match, a further action may be taken to determine whether imaging sensor 207 should be given priority over gaze detection sensor 204. As discussed previously, one such situation may occur when a listener/user is looking down, for example, to take notes. If the user is not looking down, the process may cycle through as shown in FIG. 4 until desired sound is identified successfully. If the user is looking down, then priority may be given to the imaging sensor 207, or to microphone array 202, along the lines discussed earlier.

In an embodiment, at 405, there may be processing to determine whether the noise cancelling algorithm being implemented is working successfully, e.g. to see whether sound that is not coming from the speaker or the desired sound source is being identified successfully. If not, then at 406 the process may be returned to the beginning, as shown in FIG. 4, or to another place in the flow chart, e.g. 402 or 403. If there is sufficient correlation, i.e. if the unwanted sound is identified correctly, then at 407, the unwanted noise signals are removed or deemphasized using one or more of the algorithms discussed above. At 408, the desired sounds are processed to bring them into conformity with preset volume and frequency parameters. Each of 401-408 may be implemented in accordance with any of the embodiments and techniques described above with respect to FIG. 2.

The elements discussed above with respect to FIGS. 3 and 4 might be initiated automatically, upon powering up of the real-time audio processing device. Alternatively, the device might respond to a suitable user verbal command. Techniques for responding to user verbal commands will be known to ordinarily skilled artisans.

The disclosed embodiments are not limited in their applicability to music halls, lecture halls, or theaters, or to lecturers or speakers. At a party or in a crowded room, where multiple speakers may be present in proximity to a listener, some of those speakers being even louder than the one to whom a user may wish to listen, the ability to look at a particular speaker could be helpful in emphasizing that speaker's voice and cancelling out or de-emphasizing the voices of others, or sounds coming from different directions. Embodiments could be used at sporting events, subways, public streets, restaurants, or in any environment in which directional reception of sound would be helpful.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather, the disclosure extends to all functionally equivalent structures, methods, and uses such as are within the scope of the appended claims.

To the extent that method or apparatus embodiments herein are described as having certain numbers of elements, it should be understood that fewer than all of the elements may be necessary to define a complete claim. In addition, sequences of operations or functions described in various embodiments do not require or imply a requirement for such sequences in practicing any of the appended claims. Operations or functions may be performed in any sequence to effectuate the goals of the disclosed embodiments. This is the case, for example, with respect to the operations in FIG. 3, in which, for example, a user's gaze direction might be processed first, rather than processing sounds as shown, as it might be preferable to determine first whether the user's gaze has focused, and then proceed to process received sound.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

What is claimed is:

1. An apparatus, comprising:
a sensor configured to detect a direction of a gaze of a user and output a first gaze signal corresponding to the detected direction of the gaze of the user;
a digital signal processing unit configured to:
receive the first gaze signal from the sensor;
receive a second gaze signal;
receive a third gaze signal;
determine a priority for each of the first gaze signal, the second gaze signal, and the third gaze signal;
select at least one of the first gaze signal, the second gaze signal, and the third gaze signal based on the priority;
identify, in an electronic data storage, one or more available actions that correspond to the selected at least one of the first gaze signal, the second gaze signal, and the third gaze signal;
select an action from the one or more available actions; and
execute a set of computer-readable instructions that correspond to the action.

2. The apparatus of claim 1, further comprising a microphone positioned relative to a position of the sensor to provide information indicating directionality of one or more sounds that correspond to the second gaze signal.

3. The apparatus of claim 2, wherein the second gaze signal is selected based on a determination that the detected direction of the gaze of the user that corresponds to the first gaze signal is in a different direction as compared to the one or more sounds that correspond to the second gaze signal, wherein the action is selected based on the detected direction of the one or more sounds.

4. The apparatus of claim 1, wherein the first gaze signal is associated with a first priority and the second gaze signal is associated with a second priority, wherein when selecting one of the first gaze signal, the second gaze signal, and the third gaze signal based on the priority, the digital signal processing unit is configured to:
determine that the third gaze signal corresponds to an unwanted signal that corresponds to a third priority that has a lower priority than the first priority for the first gaze signal and the second priority for the second gaze signal; and
deemphasize the third gaze signal in view of the third priority having a lower priority than the first priority and the second priority.

5. The apparatus of claim 4, wherein deemphasizing the third gaze signal includes removing audio from the third gaze signal.

6. The apparatus of claim 1, wherein the digital signal processing unit is further configured to determine that a person is speaking in a direction of the user based on one or more of the first gaze signal, the second gaze signal, and the third gaze signal, wherein the action is selected based on a determination that the person is speaking in the direction of the user.

7. The apparatus of claim 1, further comprising an imaging sensor configured to detect an image, wherein the action is selected based on the image.

8. The apparatus of claim 1, wherein the third gaze signal includes an identification signal from a sound source, the identification signal including metadata that identifies either the sound source itself, or a person associated with the sound source.

9. A method, comprising:
receiving a first gaze signal from a sensor;
receiving a second gaze signal;
receiving a third gaze signal;
determining a priority for each of the first gaze signal, the second gaze signal, and the third gaze signal;
selecting at least one of the first gaze signal, the second gaze signal, and the third gaze signal based on the priority;
identifying, in an electronic data storage, one or more available actions that correspond to the selected at least one of the first gaze signal, the second gaze signal, and the third gaze signal;
selecting an action from the one or more available actions; and
executing a set of computer-readable instructions that correspond to the action.

10. The method of claim 9, further comprising receiving information indicating directionality of one or more sounds that correspond to the second gaze signal.

11. The method of claim 10, wherein the second gaze signal is selected based on a determination that a detected direction of a gaze of a user that corresponds to the first gaze signal is in a different direction as compared to the one or more sounds that correspond to the second gaze signal, wherein the action is selected based on the detected direction of the one or more sounds.

12. The method of claim 9, wherein the first gaze signal is associated with a first priority and the second gaze signal is associated with a second priority, wherein selecting one of the first gaze signal, the second gaze signal, and the third gaze signal based on the priority includes:
determining that the third gaze signal corresponds to an unwanted signal that corresponds to a third priority that has a lower priority than the first priority for the first gaze signal and the second priority for the second gaze signal; and
deemphasizing the third gaze signal in view of the third priority having a lower priority than the first priority and the second priority.

13. The method of claim 12, wherein deemphasizing the third gaze signal includes removing audio from the third gaze signal.

14. The method of claim 9, further comprising determining that a person is speaking in a direction of a user based on one or more of the first gaze signal, the second gaze signal and the third gaze signal, wherein the action is selected based on a determination that the person is speaking in the direction of the user.

15. The method of claim 9, further comprising detecting an image, wherein the action is selected based on the image.

16. The method of claim 9, wherein the third gaze signal includes an identification signal from a sound source, the identification signal including metadata that identifies either the sound source itself, or a person associated with the sound source.

17. A non-transitory machine-readable medium having stored thereon machine-readable instructions executable to cause a machine to perform operations comprising:
receive a first gaze signal from a sensor;
receive a second gaze signal;
receive a third gaze signal;

determine a priority for each of the first gaze signal, the second gaze signal, and the third gaze signal;

select at least one of the first gaze signal, the second gaze signal, and the third gaze signal based on the priority;

identify, in an electronic data storage, one or more available actions that correspond to the selected at least one of the first gaze signal, the second gaze signal, and the third gaze signal;

select an action from the one or more available actions; and execute the action.

18. The non-transitory machine-readable medium of claim 17, wherein the second gaze signal is selected based on a determination that a detected direction of a gaze of a user that corresponds to the first gaze signal is in a different direction as compared to one or more sounds that correspond to the second gaze signal, wherein the action is selected based on the detected direction of the one or more sounds.

19. The non-transitory machine-readable medium of claim 17, wherein the first gaze signal is associated with a first priority and the second gaze signal is associated with a second priority, wherein the operation to select one of the first gaze signal, the second gaze signal, and the third gaze signal based on the priority includes:

determine that the third gaze signal corresponds to an unwanted signal that corresponds to a third priority that has a lower priority than the first priority for the first gaze signal and the second priority for the second gaze signal; and deemphasize the third gaze signal in view of the third priority having a lower priority than the first priority and the second priority.

20. The non-transitory machine-readable medium of claim 17, the operations further include determine that a person is speaking in a direction of a user based on one or more of the first gaze signal, the second gaze signal and the third gaze signal, wherein the action is selected based on a determination that the person is speaking in the direction of the user.

\* \* \* \* \*